United States Patent
Park et al.

(10) Patent No.: US 12,313,317 B2
(45) Date of Patent: May 27, 2025

(54) REFRIGERATOR FOR REFRIGERATING VEHICLE USING EJECTOR AND METHOD OF CONTROLLING THE SAME

(71) Applicant: JEJU NATIONAL UNIVERSITY INDUSTRY-ACADEMIC COOPERATION FOUNDATION, Jeju-si (KR)

(72) Inventors: Youn Cheol Park, Jeju-si (KR); Gwang Soo Ko, Jeju-si (KR); Bu Chul Kim, Jeju-si (KR)

(73) Assignee: JEJU NATIONAL UNIVERSITY INDUSTRY-ACADEMIC COOPERATION FOUNDATION, Jeju-si (KR)

( * ) Notice: Subject to any disclaimer, the term of this patent is extended or adjusted under 35 U.S.C. 154(b) by 0 days.

(21) Appl. No.: 18/266,642

(22) PCT Filed: Dec. 8, 2021

(86) PCT No.: PCT/KR2021/018519
§ 371 (c)(1),
(2) Date: Jun. 12, 2023

(87) PCT Pub. No.: WO2022/131662
PCT Pub. Date: Jun. 23, 2022

(65) Prior Publication Data
US 2024/0044562 A1 Feb. 8, 2024

(30) Foreign Application Priority Data
Dec. 11, 2020 (KR) .................. 10-2020-0173334

(51) Int. Cl.
*F25B 49/02* (2006.01)
*B60P 3/20* (2006.01)
(Continued)

(52) U.S. Cl.
CPC ................ *F25B 49/02* (2013.01); *B60P 3/20* (2013.01); *F25B 9/08* (2013.01); *F25B 41/31* (2021.01)

(58) Field of Classification Search
CPC ............ F25B 9/08; F25B 49/02; F25B 41/31
See application file for complete search history.

(56) References Cited

FOREIGN PATENT DOCUMENTS

| | | |
|---|---|---|
| JP | 2011-214741 | 10/2011 |
| JP | 2016-61472 | 4/2016 |
| KR | 10-1171151 | 8/2012 |

*Primary Examiner* — Nael N Babaa
(74) *Attorney, Agent, or Firm* — LEX IP MEISTER, PLLC

(57) ABSTRACT

Disclosed herein is a refrigerator for a refrigerating vehicle using an ejector and a method for controlling the same. According to the present invention, a refrigerator for a refrigerator vehicle comprises a vapor compressor system where a compressor, a condenser, a refrigerant tank, an expansion valve, and an evaporator are connected through a flowing line, an ejector refrigerant system whose one end connected to an outlet of the refrigerant tank and whose other end connected to an inlet of the compressor, a flow control valve for distributing a refrigerant flowing between the ejector refrigerant system and the outlet, and a controller connected to an engine of a refrigerating vehicle connected to control the flow control valve if an RPM of the engine exceeds a setting value. The flow control valve distributes a gaseous refrigerant of a high temperature and a high pressure to the ejector of the ejector refrigerant system and the expansion valve of the vapor compressor system.

4 Claims, 10 Drawing Sheets

(51) Int. Cl.
*F25B 9/08* (2006.01)
*F25B 41/31* (2021.01)

REFRIGERATOR FOR REFRIGERATING VEHICLE USING EJECTOR AND METHOD OF CONTROLLING THE SAME

TECHNICAL FIELD

The present invention relates to a refrigerator for a refrigerator vehicle using an ejector and a method for controlling the same.

BACKGROUND ART

In general, refrigerating vehicles including refrigerators load goods for requiring freezing and refrigerating on refrigerating containers to be transferred. During transport, the refrigerating vehicles perform a function to keep qualities and freshness of goods by refrigeration.

These refrigerators of the refrigerating vehicles comprise a compressor for compressing refrigerants, a condenser for condensing the compressed refrigerants to convert liquid, and an evaporation unit for evaporating the refrigerants in order that the converted liquid refrigerants of a low temperature and pressure absorb ambient heat to cool inside of refrigerating containers of refrigerating vehicles.

In this case, the compressor receives power supply from an engine of the refrigerating vehicles to compress the refrigerants. The power supply of the engine is distributed to running power of the refrigerating vehicles and operating power of the compressor so that output power of the refrigerating vehicles is decreased and a fuel consumption is increased. As a result, when the refrigerating vehicles is operated, the refrigerating performance is dramatically changed according to a variation of RPM (Revolution Per Minute) of the engine.

SUMMARY OF THE INVENTION

It is therefore an object of the present invention to provide a refrigerator for a refrigerating vehicle using an ejector and a method for controlling the same by differently operating a refrigeration system depending on an RPM of the refrigerating vehicle to reduce a fuel consumption of the refrigerating vehicle.

Embodiments of the present invention provide a refrigerator for a refrigerator vehicle comprising a vapor compressor system where a compressor, a condenser, a refrigerant tank, an expansion valve, and an evaporator are connected through a flowing line, an ejector refrigerant system whose one end connected to an outlet of the refrigerant tank and whose other end connected to an inlet of the compressor, a flow control valve for distributing a refrigerant flowing between the ejector refrigerant system and the outlet, and a controller connected to an engine of a refrigerating vehicle connected to control the flow control valve if an RPM of the engine exceeds a setting value. In this case, the flow control valve distributes a gaseous refrigerant of a high temperature and a high pressure to the ejector of the ejector refrigerant system and the expansion valve of the vapor compressor system.

In some embodiments, the setting value is 1,800 RPM.

In some embodiments, the ejector refrigerant system comprises an ejector including a body in which a suction room is formed, a motive pipe connected to the body, a suction pipe, and a discharging pipe, a first ejector line for the outlet of the refrigerant tank and the motive pipe, a second ejector line for connecting the discharging pipe and the inlet of the condenser, a third ejector line for connecting the suction pipe and an outlet of the evaporator, and a heat exchanging unit for recycling a waste heat and arranged in the first ejector line. In this case, a refrigerant of the first ejector line is exchanged heat with the waste heat of the heat exchanging unit.

In some embodiments, the ejector refrigerant system further comprises a first valve arranged between the third ejector line and the outlet of the evaporator and a second valve arranged between the second ejector line and the inlet of the compressor.

In some embodiments, the flow control valve distributes a gaseous refrigerant of a high temperature and a high pressure discharged from the compressor to the ejector and the expansion valve in the ratio of 1:9 to 3:7.

Embodiments of the present invention provide a method of controlling a refrigerator for s refrigerating vehicle using an ejector comprising providing cold air to a refrigerating container by operating a compressor of a vapor compressor system by an engine power of the refrigerating vehicle and making a refrigerant flowing along a flowing line, determining whether an engine RPM of the refrigerating vehicle exceeds a setting value through a signal sensed from an RPM sensor using a controller, and distributing the refrigerant discharged from the compressor to an expansion valve of the vapor compressor system and an ejector of an ejector refrigerating system by controlling a flow control valve if a RPM exceeds the setting value. In this case, a temperature of the distributed refrigerant via the heat exchange unit is increased to income into the ejector, and the refrigerant via the expansion valve incomes into the ejector by way of an evaporator, and the refrigerant is mixed with a refrigerant whose temperature is increased in the ejector to be emitted into an inlet of the compressor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
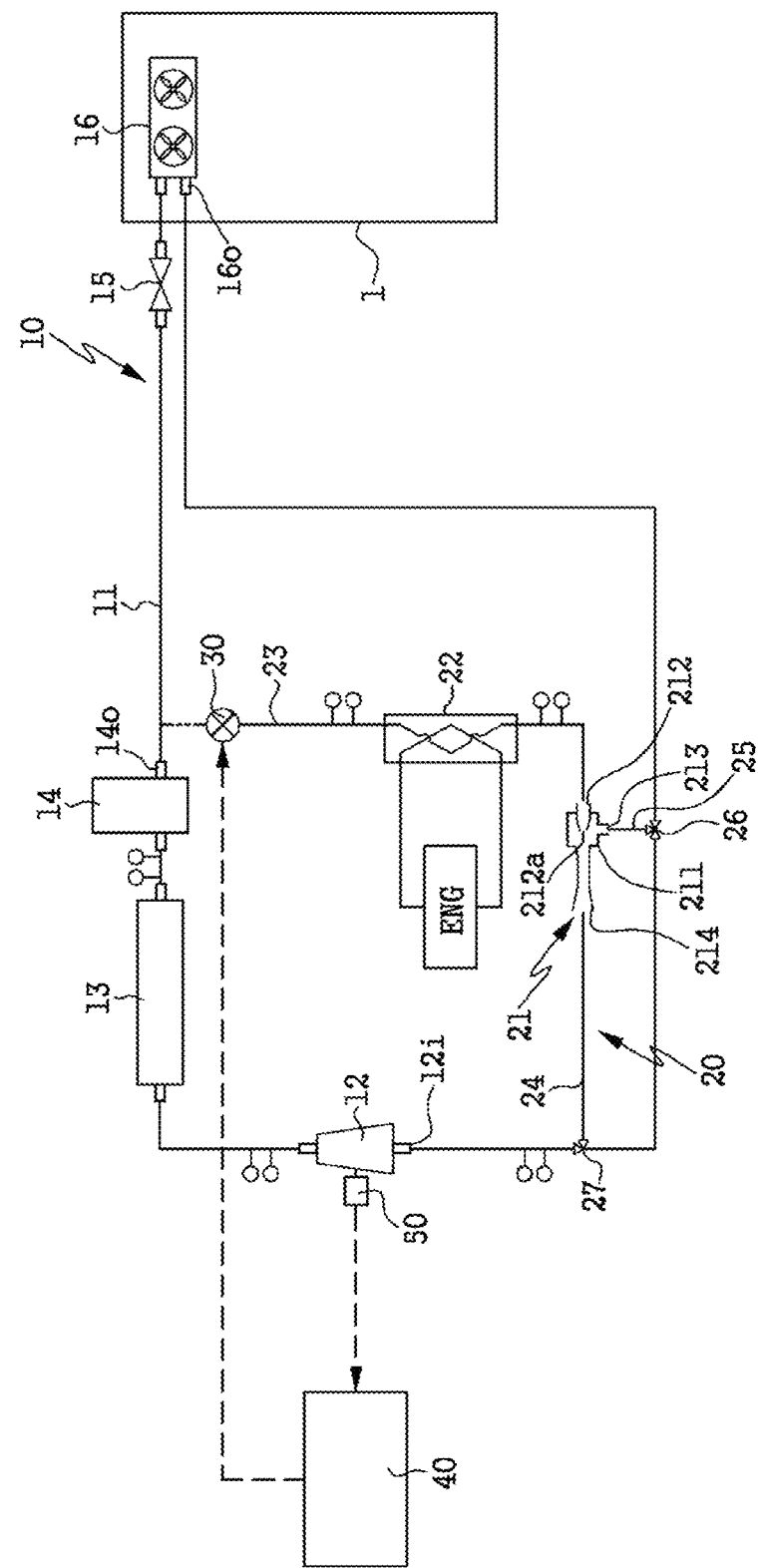
FIG. 1 is a schematic view for showing a refrigerator for a refrigerating vehicle using an ejector according to an embodiment of the present invention.

Hereinafter, the present invention will be described in detail with reference to the drawings. In describing the present invention, detailed descriptions related to publicly known functions or configurations will be omitted in order not to obscure the gist of the present invention.

The present invention may, however, be embodied in different forms and should not be construed as limited to the embodiments set forth herein.

Various modifications to the preferred embodiments will be readily apparent to those skilled in the art and the generic principles herein may be applied to other embodiments. Thus, the present invention is not limited to the embodiment shown but is to be accorded the widest scope consistent with the principles and features described herein.

The present invention may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

FIG. 1 is a schematic view for showing a refrigerator for a refrigerating vehicle using an ejector according to an embodiment of the present invention.

Referring to FIG. 1, the refrigerator for the refrigerating vehicle using the ejector according to an embodiment of the present invention comprises a vapor compressor system 10, an ejector refrigerant system 20, a flow control valve 30, and a controller 40, and is capable of reducing a fuel consumption of the refrigerating vehicle by differently operating a refrigeration system depending on an RPM of the refrigerating vehicle.

The vapor compressor system 10 includes a flowing line 11 in which a refrigerant can be flowed, a compressor 12, a condenser 13, a refrigerant tank 14, an expansion valve 15, and an evaporator 16.

The flowing line 11 is formed in a closed-loop shape and in which a refrigerant can be flowed. The compressor 12, the condenser 13, the refrigerant tank 14, the expansion valve 15, and the evaporator 16 are arranged in the flowing line 11 successively. A flow meter (not shown) for checking a flow rate of a refrigerant is arranged between the refrigerant tank 14 and the expansion valve 15.

The compressor 12 is connected to an engine of the refrigerating vehicle along an axis to be driven by an engine power. A gaseous refrigerant of a high temperature and a high pressure discharged from the compressor 12 flows along the flowing line 11 and goes by way of the condenser 13, the expansion valve 15, and the evaporator 16. A liquid refrigerant of a high temperature and a high pressure discharged from the condenser 13 is stored at the refrigerant tank 14 and then can be flowed to the expansion valve 15.

In this case, the evaporator 16 is arranged inside a refrigerant system 1 in which goods are loaded in the refrigerating vehicle. The compressor 12, the condenser 13, the refrigerant tank 14, and the expansion valve 15 are arranged outside the refrigerant system 1. The evaporator 16 is capable of providing cool air into the inside of the refrigerant system 1 by action or state change of a refrigerant.

The operation according to refrigerating flows, state change, and so forth of the vapor compressor system 10 is the same as a well-known refrigeration cycle, and therefore, to avoid description duplication, their description is omitted herein.

The ejector refrigerant system 20 includes an ejector 21, a first ejector line 23, a second ejector line 24, a third ejector line 25, and a heat exchange unit 22. The ejector refrigerant system 20 further includes a first valve 26 and a second valve 27.

The ejector 21 is arranged adjacent to the compressor 12, and includes a body 211 in which a suction room is formed, a motive pipe 212 connected to the body 211, a suction pipe 213, and a discharging pipe 214. A diameter of a nozzle arranged inside the body 211 to be connected to the motive pipe 212 is ranged from 5 mm to 6 mm, and preferably ranged from 5.4 mm. Since the ejector 21 has the same construction and effect as those of a conventional ejector, further explanation is omitted.

A refrigerant can be flowed in the first ejector line 23, the second ejector line 24, and the third ejector line 25. The first ejector line 23 connects an outlet 41o of the refrigerant tank 14 and the motive pipe 212. A flow meter (not shown) is arranged in the first ejector line 23. The second ejector line 24 connects the discharging pipe 214 and an inlet 12i of the compressor 12. The third ejector line 25 connects an outlet 16o of the evaporator and the suction pipe 213.

The heat exchange unit 22 is arranged in the first ejector line 23 and in which a waste heat recycled from the engine of the refrigerating vehicle can be flowed. The heat exchange unit 22 includes a plate heat exchanger but not limited. Various kinds of structures can be applied if a waste heat is exchanged heat with a refrigerant.

Accordingly, the waste heat of the engine can be exchanged heat with a refrigerant flowing in the first ejector line 23. The waste heat is transferred to the refrigerant so that a temperature of the refrigerant flowing in the first ejector line 23 can be increased.

The first valve 26 connects the outlet 16o of the evaporator 16 and the third ejector line 25 to control making the refrigerant discharged from the outlet 16o flow to the compressor 12 or the third ejector line 25. By control of the first valve 26, the refrigerant discharged from the outlet 16o may not flow to the third ejector line 25.

The second valve 27 connects the inlet 12i of the compressor 12 and the second ejector line 24 to control making the refrigerant discharged from the discharging pipe 214 flow to the compressor 12. By control of the second valve 27, a refrigerant flowing the flowing line 11 may not flow to the second ejector line 24.

In the meanwhile, a plurality of sensors for measuring a pressure and a temperature of a refrigerant are formed in the flowing line 11 and the first ejector line 23 at intervals.

The controller 40 includes a torque meter and a RPM sensor which are arranged at an axis for connecting the engine and the compressor 12, and is capable of measuring a power consumption. The controller 40 is connected to the flow control valve 30. If a RPM value measured by the RPM sensor exceeds a setting value, the controller 40 applies a signal in order to distribute the gaseous refrigerant of the high temperature and the high pressure discharged from the compressor 12 toward the expansion valve 15 and the ejector 21. In this case, the setting value is 1,800 RPM The flow control valve 30 is capable of distributing the gaseous refrigerant of the high temperature and the high pressure discharged from the compressor 12 and going by way of the refrigerant tank 14 toward the first ejector line 23 and the expansion valve 15. The refrigerant distribution ratio of the ejector 21 and the expansion valve 15 may be 1:9 to 3:7 or 2:8. The gaseous refrigerant of the high temperature and the high pressure distributed to the first ejector line 23 goes by way of the heat exchange unit 22 to be exchanged heat with a waste heat so that a temperature of the gaseous refrigerant can be more increased. The refrigerant can be influxed inside of the body 211 through the motive pipe 212.

Next, referring to FIGS. 2 and 3, a method of controlling a refrigerator for a refrigerating vehicle using the above-mentioned ejector will be described hereinafter.

Figure 2:
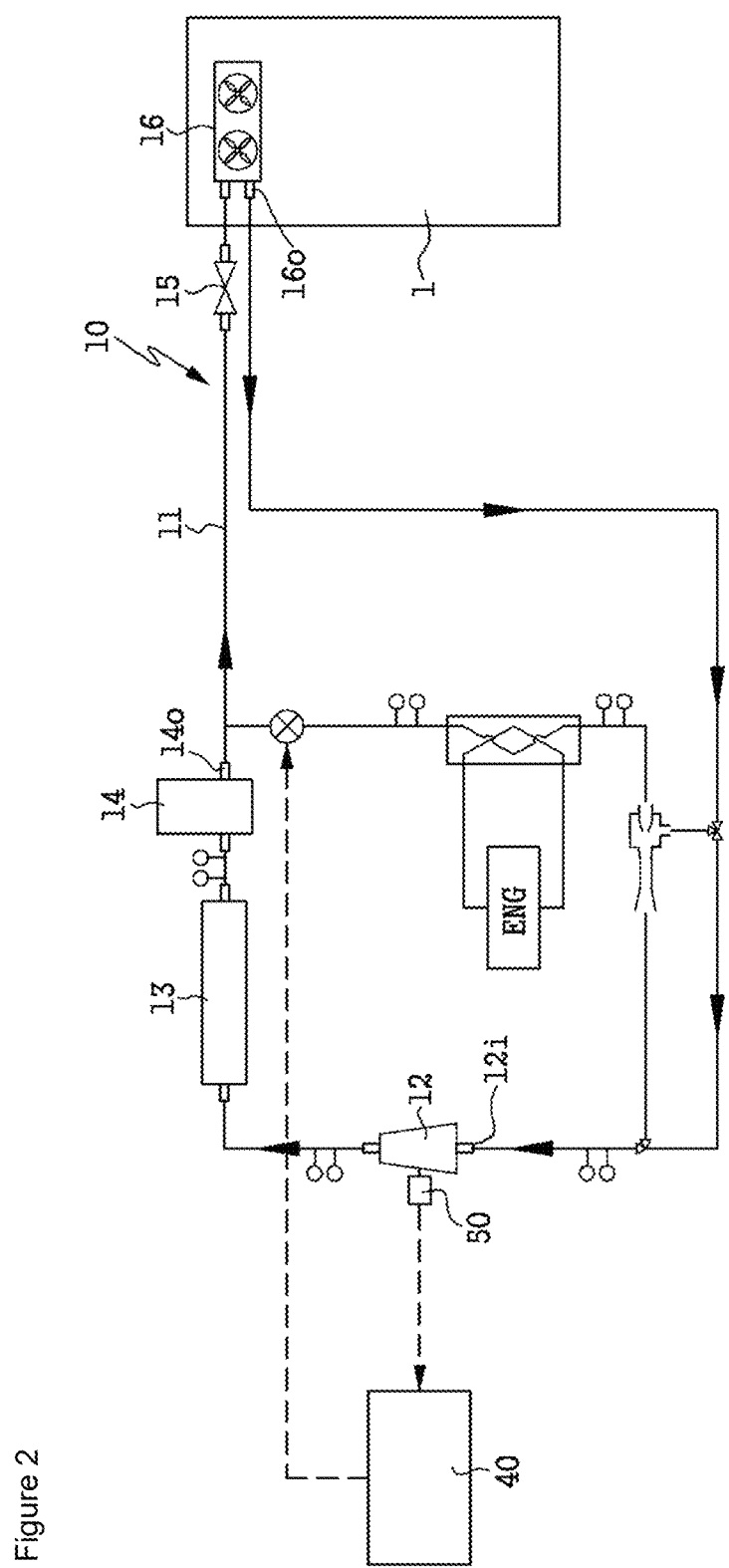
FIG. 2 a schematic view for showing an operating status of a vapor compressor system using the refrigerator for the refrigerating vehicle using the ejector according to the present invention.

A refrigerant flows along the flowing line 11 by operating the compressor 12 of the vapor compressor system 10 by the engine power of the refrigerating vehicle and then is phase changed by going by way of the condenser 13, the expansion valve 15, and the evaporator 16 to provide a cool air to the refrigerant system 1 (See FIG. 2).

Figure 3:
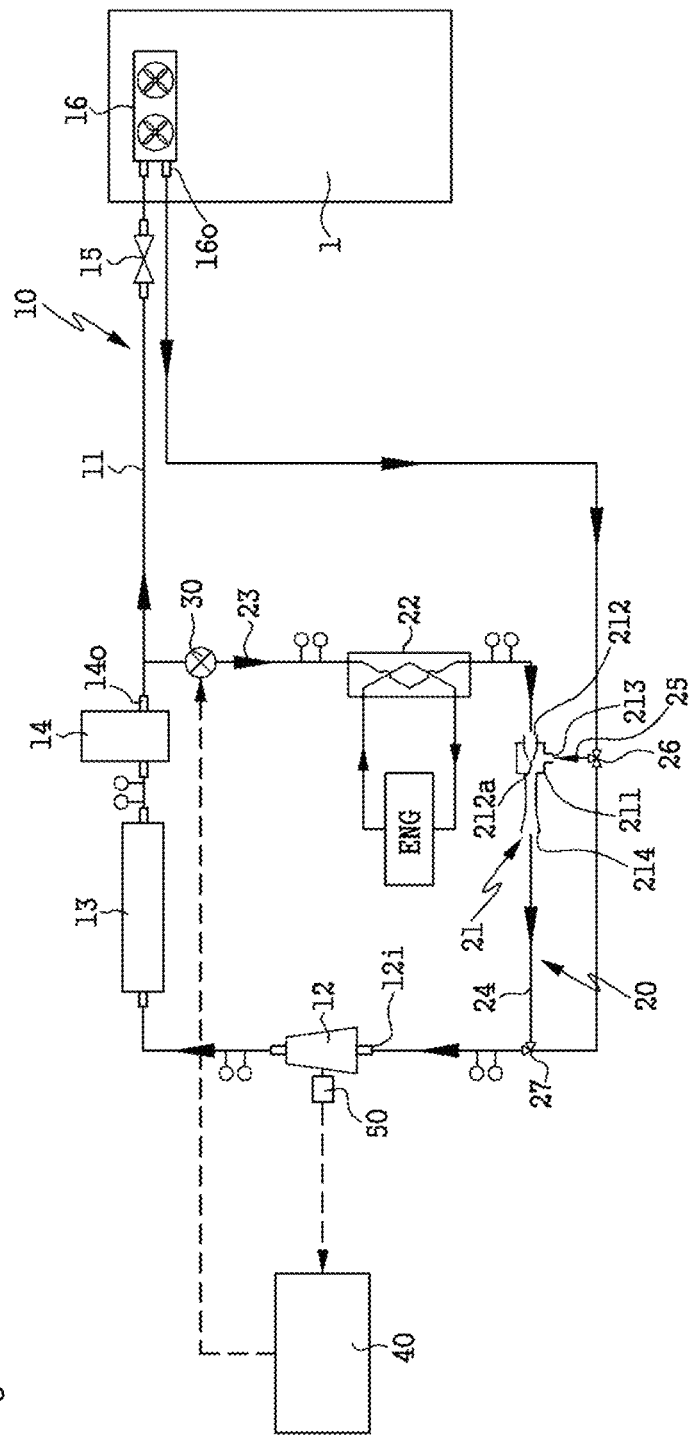
FIG. 3 a schematic view for showing an operating status of the vapor compressor system of the refrigerator for the refrigerating vehicle using the ejector and an ejector refrigerant system according to an embodiment of the present invention.

Referring to FIG. 3, the RPM sensor 50 senses a RPM of the engine and transfers the sensed signal to the controller 40. The controller 40 determines whether a RPM in the transferred signal exceeds a setting value. If the RPM exceeds the setting value, the controller 40 controls that the flow control valve 30 distributes the gaseous refrigerant of the high temperature and the high pressure discharged from the compressor 12 toward the expansion valve 15 and the heat exchange unit 22. The flow control valve distributes the gaseous refrigerant of the high temperature and the high pressure toward the heat exchange unit 22 and the expansion valve 15 in a ratio of 2:8 based on a control signal.

The gaseous refrigerant of the high temperature and the high pressure distributed toward the heat exchange unit 22 goes by way of the heat exchange unit 22 through the first ejector line 23 to be changed heat with a waste heat so that a temperature of the distributed gaseous refrigerant can be increased. The refrigerant can be injected into inside of the body 211 through the motive pipe 212 and a nozzle 212a.

The gaseous refrigerant of the high temperature and the high pressure distributed toward the expansion valve 15 goes by way of the expansion valve 15 and the evaporator 16 to provide a cool air to the refrigerating system 1. A gaseous refrigerant of a low temperature and a low pressure discharged from the evaporator 16 can be flowed to the third ejector line 25 by the control of the first control valve 26. The refrigerant of the third ejector line 25 can be influxed into inside of the body 211 due to the pressure of a refrigerant influxed from the first ejector line 23 to inside of the body 211. The gaseous refrigerant of the high temperature and the high pressure of the first ejector line 23 and the gaseous refrigerant of the low temperature and the low pressure of the third ejector line 25 are mixed inside of the body 211. At this time, the temperature of the gaseous refrigerant of the low temperature and the low pressure can be increased by the gaseous refrigerant of the high temperature and the high pressure.

The refrigerant mixed inside of the body 211 is discharged through the discharging pipe 214. The refrigerant mixed inside of the body 211 flows the second ejector line 24 to be influxed into inside of the compressor 12 by the control of the second valve 27. The state of the refrigerant discharged to the ejector 21 has a more enhanced high temperature and a high pressure rather than that of the refrigerant sucked to the evaporator 16, and thereby reduce a power consumption of the compressor 12. Therefore, the refrigerator for a refrigerator vehicle has a high COP (Coefficient of Performance) in comparison with a conventional V.C.S (Vapor Compressor System)

Performance Analysis of Vapor Compressor System and Ejector Refrigerant System

The components of the refrigerator were employed based on the components used in a real refrigerating vehicle. By adding and ejector and a heat exchange unit for recycling a waste heat from an engine, an ejector refrigerant system was completed. A compressor applied to a refrigerating vehicle was a 2.24 kW scale compressor for a vehicle. The capacity of an evaporator installed inside of the refrigerating system 1 of the refrigerating vehicle was a 11.6 kW scale. A condenser having 13.65 kW scale capacity was installed.

The nozzle size of an ejector installed in an ejector refrigerant system for a refrigerating vehicle was 5.4 mm based on the result that a performance could be improved when the nozzle size of the ejector become large as the capacity of the refrigerator was increased.

A performance comparison experiment was carried out on condition that a plate heat exchanger of the heat exchange unit having 1 kW scale smaller than the ejector refrigerant system was installed. In the ejector refrigerant system for the refrigerating vehicle, R-404A being a refrigerant used in a conventional refrigerating vehicle was employed as a working fluid.

Experimental Condition and Method

After manufacturing an ejector refrigerant system for a refrigerating vehicle, a performance test of a conventional vapor compressor system for a refrigerating vehicle and an ejector refrigerant system was conducted. On condition that an internal temperature of the refrigerating container was maintained at 0° C. degree and an external temperature of the refrigerating vehicle was maintained at 30° C. degree according to KS R 1049 being an internal temperature standard (a performance test method of cold chain of frozen and refrigeration vehicles) of a refrigerating container for a refrigerating vehicle, a performance comparison experiment of the conventional vapor compressor system for a refrigerating vehicle and the ejector refrigerant system including an ejector was conducted.

An ejector having a nozzle size of 5.4 mm was installed in the ejector refrigerant system.

Figure 4:
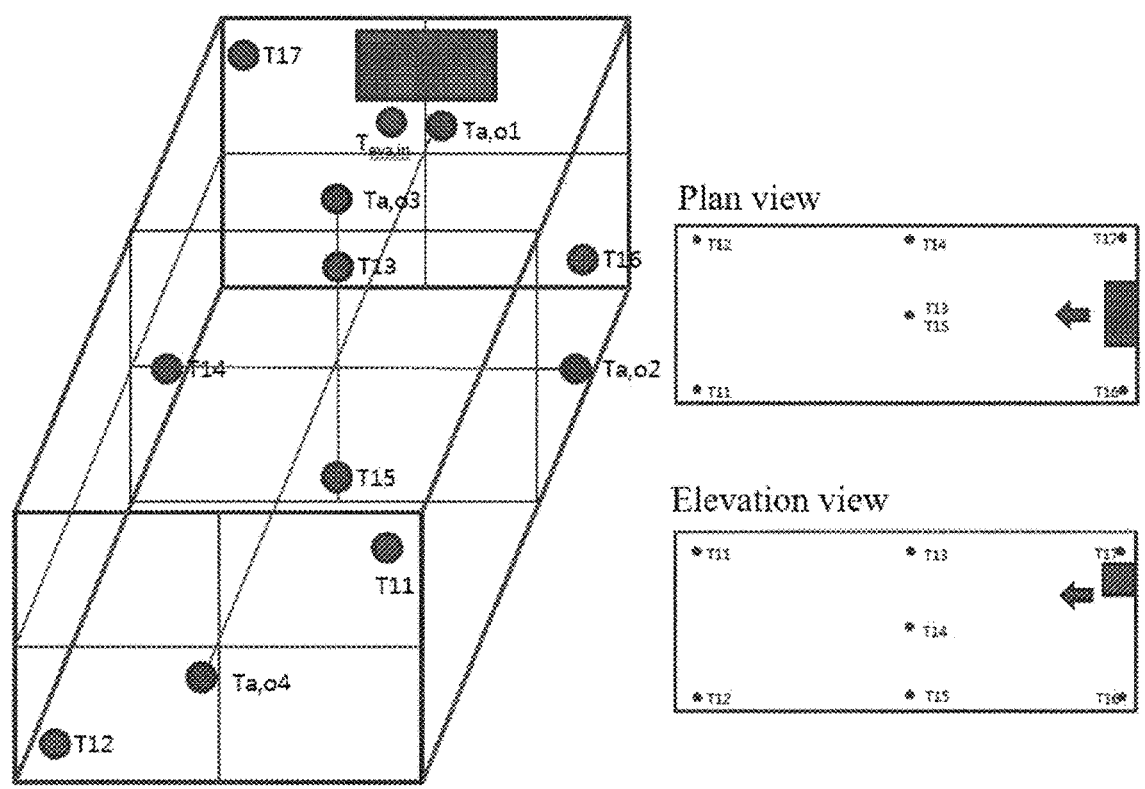
FIG. 4 is a schematic view for showing a location of a temperature sensor of the refrigerator for a refrigerator using an ejector on a refrigerating container according to the present invention.

In order to raise the accuracy of the experiment, as shown in FIG. 4, temperature sensors were installed at 7 areas inside the refrigerating container. Outside the refrigerating container, the temperature sensors were installed at 4 areas.

The internal temperature of the refrigerating container of the refrigerating vehicle become low as the refrigerating system was driven. Thus, a setting temperature was kept by installing additional SCR electric heater of 5 kW scale. The external temperature of the refrigerating vehicle was kept at 30±2° C. degree by installing the refrigerating vehicle in a constant temperature chamber including 100 kW scale thermos-hygrostat. After that, the vapor compressor system and the ejector refrigerant system were driven to carry out the performance comparison experiment of them. In this case, the measurement time was 30 minutes every 5 seconds.

Test Method of Performance Comparison Experiment

The specification of a sensor installed to evaluate the performance of an ejector refrigerant system for a refrigerating vehicle and a vapor compressor system is as following table 1.

TABLE 1

| Sensor | Specification | |
| --- | --- | --- |
| Temperature | Type | T-type |
| | Range | −200~400° C. |
| | Accuracy | ±2% |
| Pressure | Range | 0.4~2 Mpa |
| | Accuracy | ±0.25% |
| Mass flow of refrigerant | Standard Uncertainty | ±0.044% |
| | Fluid | Refrigerant |
| | Maximum Flow Rate | 2,720 Liter/h |
| | Accuracy | ±0.5% (Liquid) |
| Torque meter | Range | 0~6,000 (50 N*m) |
| | Accuracy | ±0.2% |
| RPM Sensor | Range | 1 to 20,000 RPM/min |
| | Accuracy | ±0.02% |

Based on the above-mentioned measured data, the performance such as a refrigerating capacity Qe, a required power of a compressor P, COP of the refrigerating systems, and an efficiency improvement rate of the refrigerating systems η of main components was calculated by multiplying a refrigerant flow rate by a refrigerant enthalpy by measuring the temperature and the pressure of each of the main components according to formulas 1 to 4.

Refrigerating capacity ($Q_e$) [Formula 1]

$$Q_e = m_{ref} \times (h_{eva,out} - h_{eva,in})$$

= Refrigerant flow rate × (Eva outlet enthalpy − Eva inlet enthalpy)

($m_{ref}$ is the refrigerant flow rate, $h_{eva,out}$ is the enthalpy at the outlet of the evaporator, $h_{eva,in}$ is the enthalpy at the inlet of the evaporator.)

Required power of Compressor (P)

$$P(W) = T_r \times R.P.M/9.5488$$ [Formula 2]

($T_r$ is the engine shaft torque, and R.P.M is the number of shaft rotations that power the compressor.)

Coefficient of Performance (COP) [Formula 3]

$$COP = \frac{Q_e}{Q_{comp}}$$

($Q_{comp}$ is the required power of the compressor, and $Q_e$ is the freezing capacity.)

Efficiency Improvement Rate (η) [Formula 4]

$$\eta(\%) = \frac{\text{Ejector refrigerant system} - \text{Vapor compressor system}}{\text{Vapor compressor system}} \times 100$$

(Ejector Refrigerant System is the ejector refrigeration system COP, and Vapor Compressor System is the COP of the steam compression refrigeration cycle.)

In order to measure a power consumption of a compressor for vehicles used in the ejector refrigerant system for a refrigerating vehicle and the vapor compressor system, a power consumption of the compressor was measured by installing the torque meter and the RPM sensor in an axis connected to the compressor.

Comparative Performance Result

An experiment for analyzing the performance of a vapor compressor system and a refrigerating system including an ejector using an ejector system for a refrigerating vehicle was carried out.

Figure 5:
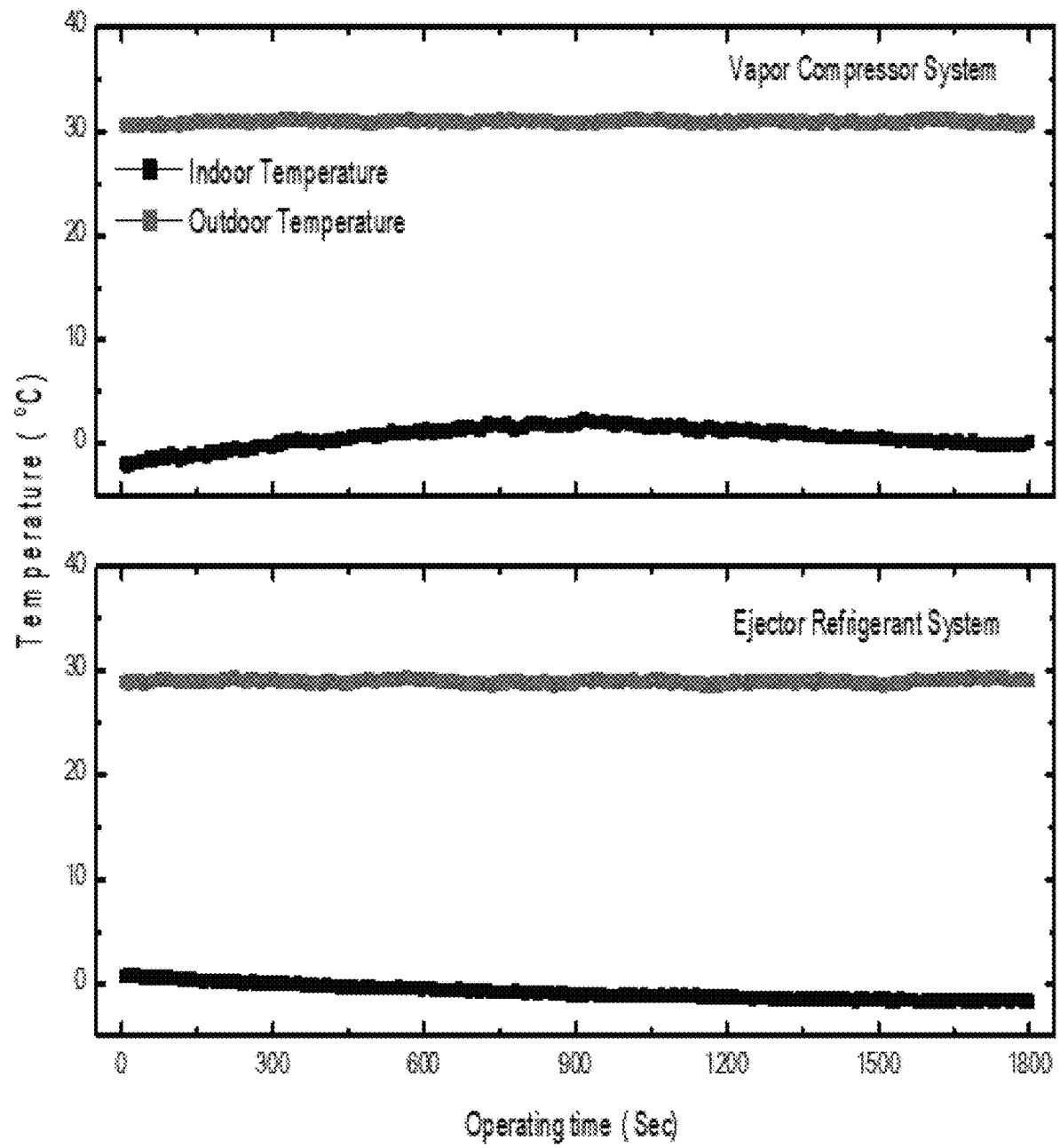
FIG. 5 shows a graph for illustrating changes of internal and external temperature of a refrigerating container in a refrigerating vehicle depending on an operating time of an ejector refrigerant system and a vapor compressor system according to the present invention.

FIG. 5 shows an experiment condition when each of the systems are driven. As shown in FIG. 5, on condition that internal and external temperature conditions of the vapor compressor system of the ejector refrigerant system were almost the same, the systems were operated.

Figure 6:
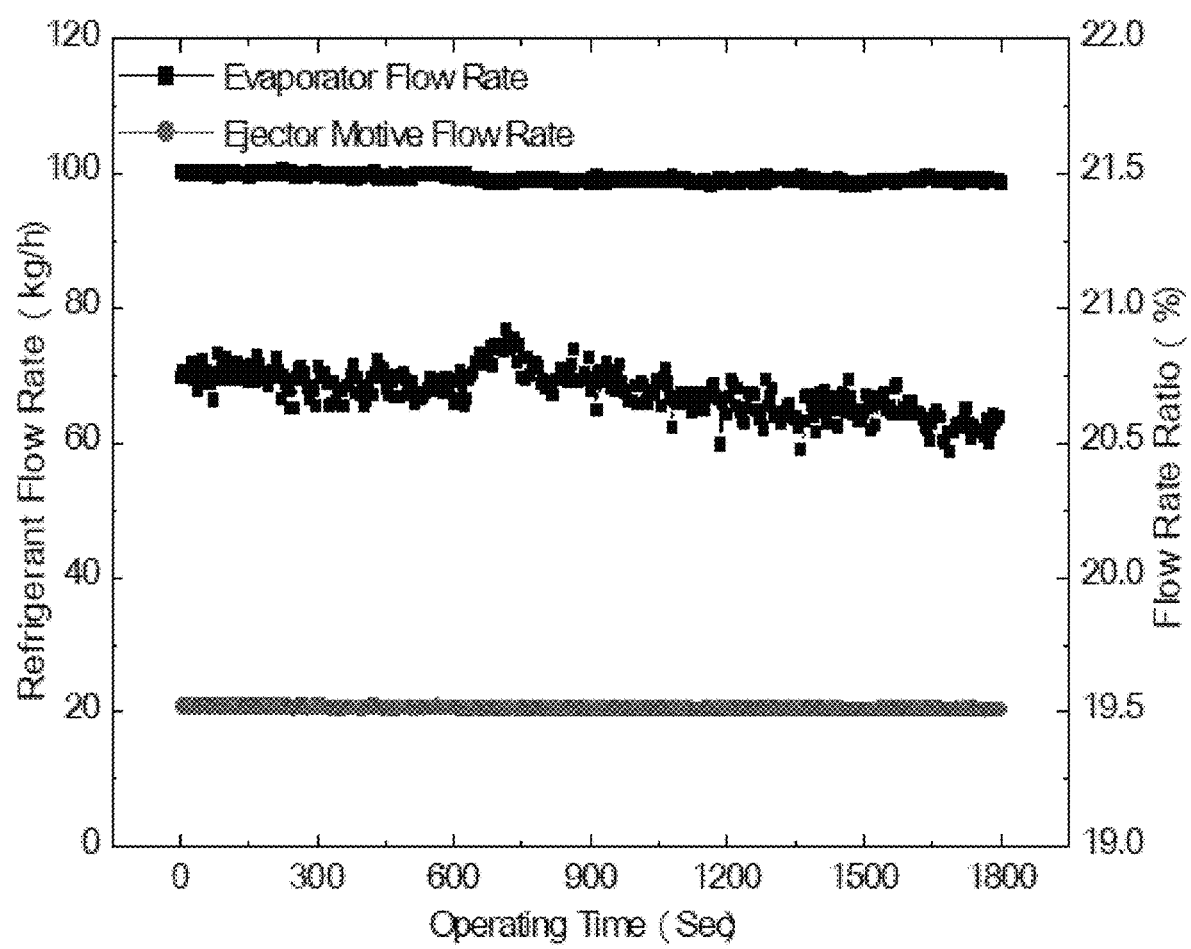
FIG. 6 shows a graph for illustrating changes of a refrigerant flow rate of an evaporator and motive refrigerant flow ratio of an ejector depending on an operating time of an ejector refrigerant system and a vapor compressor system according to the present invention.

FIG. 6 shows a refrigerant flow rate and flow ratio flowing into an evaporator and a motive pipe of an ejector when the ejector refrigerant system was operated at an evaporation temperature of 0° C. The refrigerant flow rate flowing into the evaporator was 99.20 kg/h on average, and the refrigerant flow rate flowing into the motive pipe of the ejector was 20.52 kg/h on average, so that on condition that the flow ratio was 20.52%, the ejector refrigerant system was operated.

Figure 7:
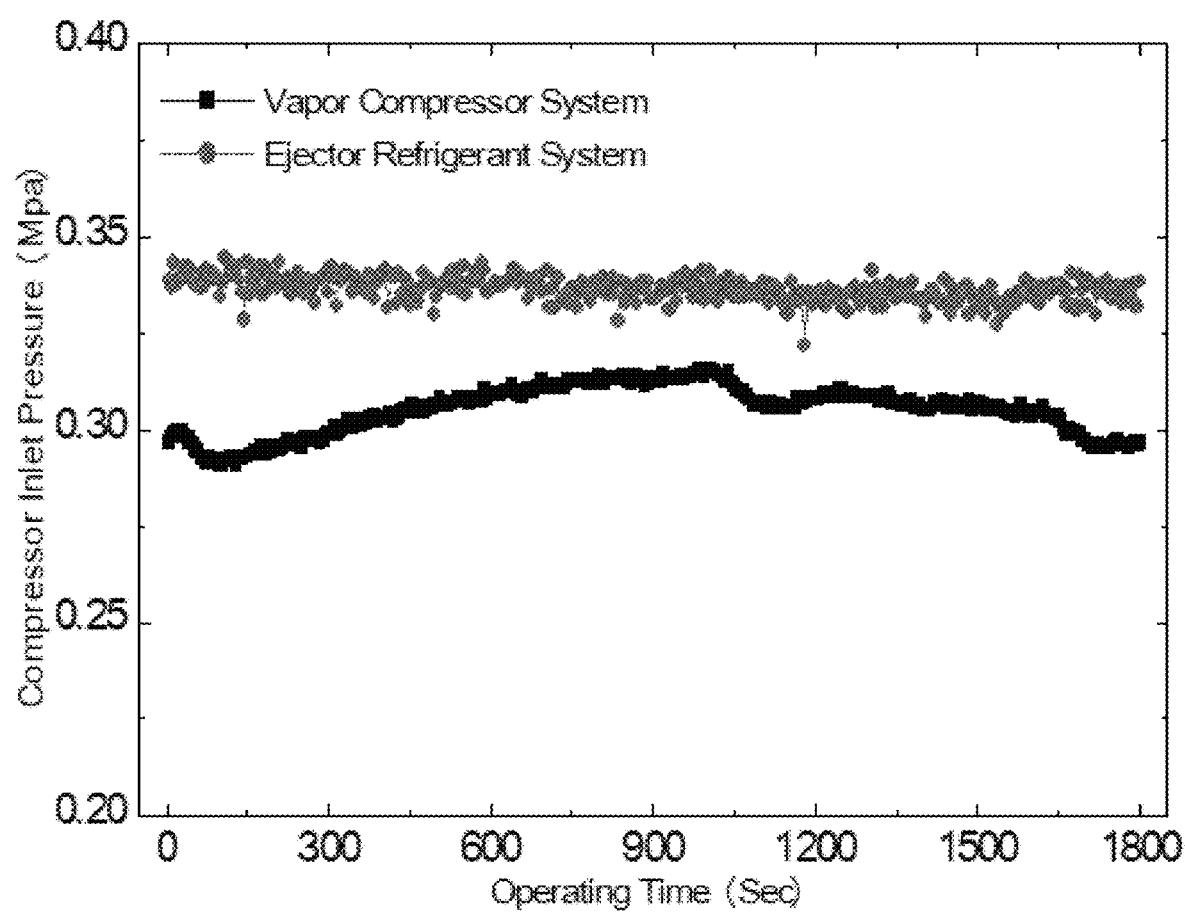
FIG. 7 shows a graph for illustrating a suction change of a compressor depending on an operating time of an ejector refrigerant system and a vapor compressor system according to the present invention.

FIG. 7 shows a graph for illustrating a suction pressure of a compressor of a vapor compressor system and an ejector refrigerant system for a refrigerating vehicle with an ejector. The suction pressure of the vapor compressor system was 0.305 Mpa on average, and the suction pressure of the ejector refrigerant system for the refrigerating vehicle with an ejector was 0.336 Mpa on average. We found that the suction pressure of the ejector refrigerant was 10% or more higher than that of the vapor compressor system.

Figure 8:
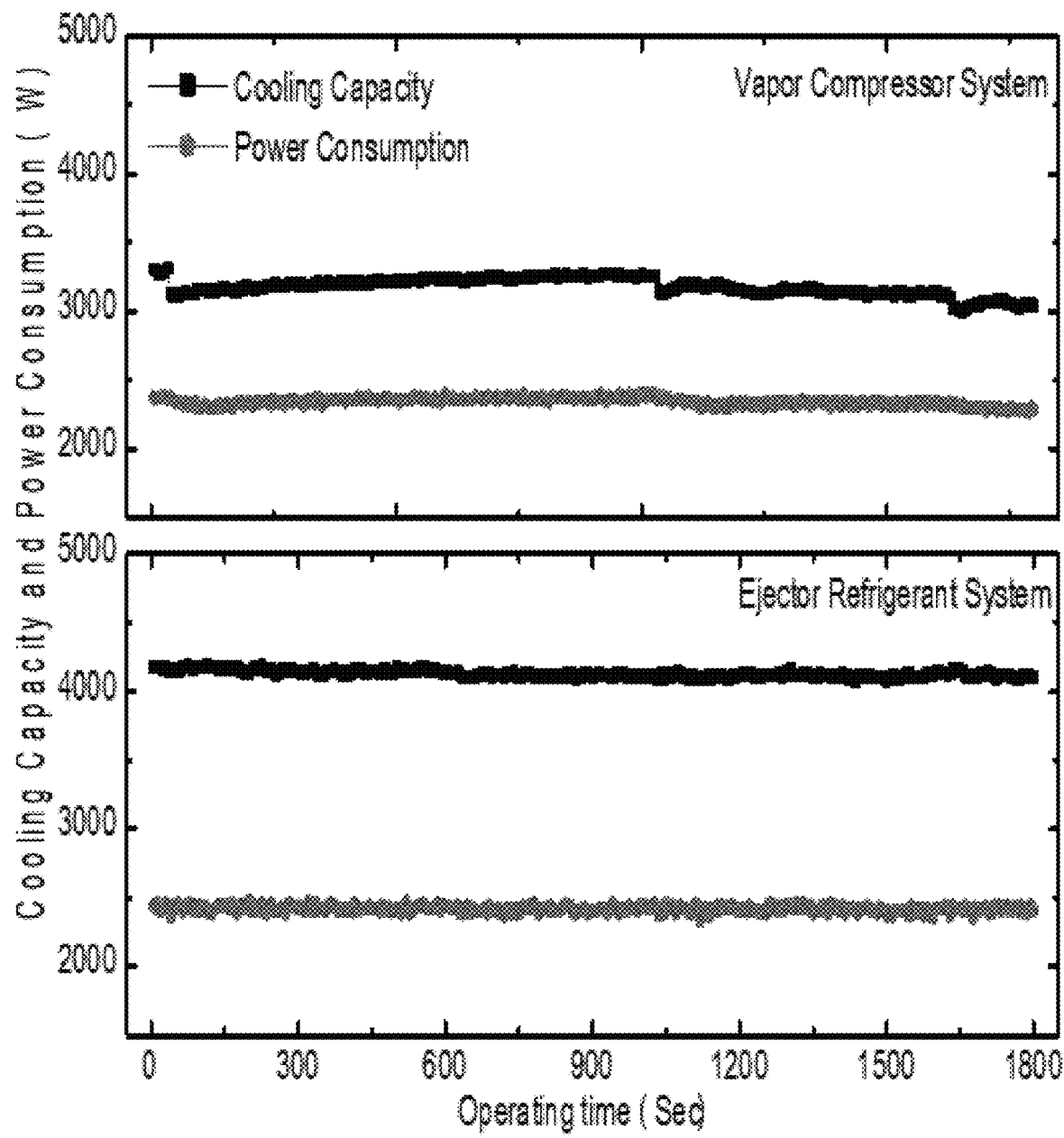
FIG. 8 shows a graph for illustrating a cooling capacity and a power consumption depending on an operating time of an ejector refrigerant system and a vapor compressor system according to the present invention.

Under the same experimental conditions, FIG. 8 shows the refrigerating capacity and the power consumption of when a vapor compressor system and an ejector refrigerant system for a refrigerating vehicle were driven. The refrigerating capacity of the vapor compressor system was 3,200 W and the refrigerating capacity of the ejector refrigerant system for the refrigerating vehicle was 4,130 W. We found that the refrigerating capacity of the ejector refrigerant was 29% higher than that of the vapor compressor system.

In addition, the power consumption of the compressor of the vapor compressor system was 2,349 W, and the power consumption of the compressor of the ejector refrigerant system for the refrigerating vehicle was 2,420 W. We found that the power consumption of the compressor of the ejector refrigerant system for the refrigerating vehicle was 3% higher than that of the compressor of the vapor compressor system.

Figure 9:
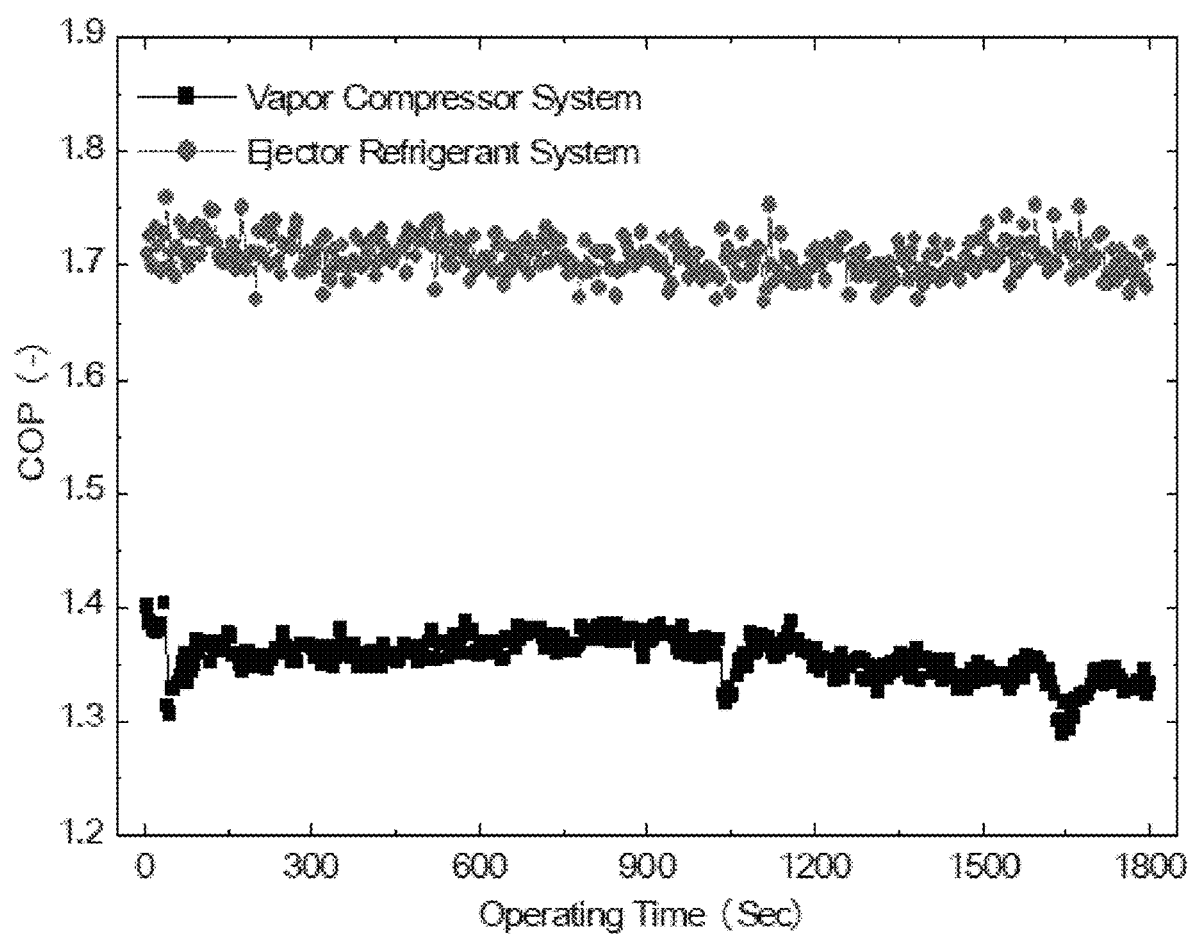
FIG. 9 shows a graph for illustrating a COP variation depending on an operating time of an ejector refrigerant system and a vapor compressor system according to the present invention.

FIG. 9 shows a graph for illustrating a COP variation showing the performance of an ejector refrigerant system for a refrigerating vehicle and a vapor compressor system. As shown in FIG. 9, the COP of the ejector refrigerant system for the refrigerating vehicle has much higher than that of the vapor compressor system. We found that the performance efficiency rate of the ejector refrigerant system for the refrigerating vehicle with an ejector was 26% higher than that of the vapor compressor system.

Figure 10:
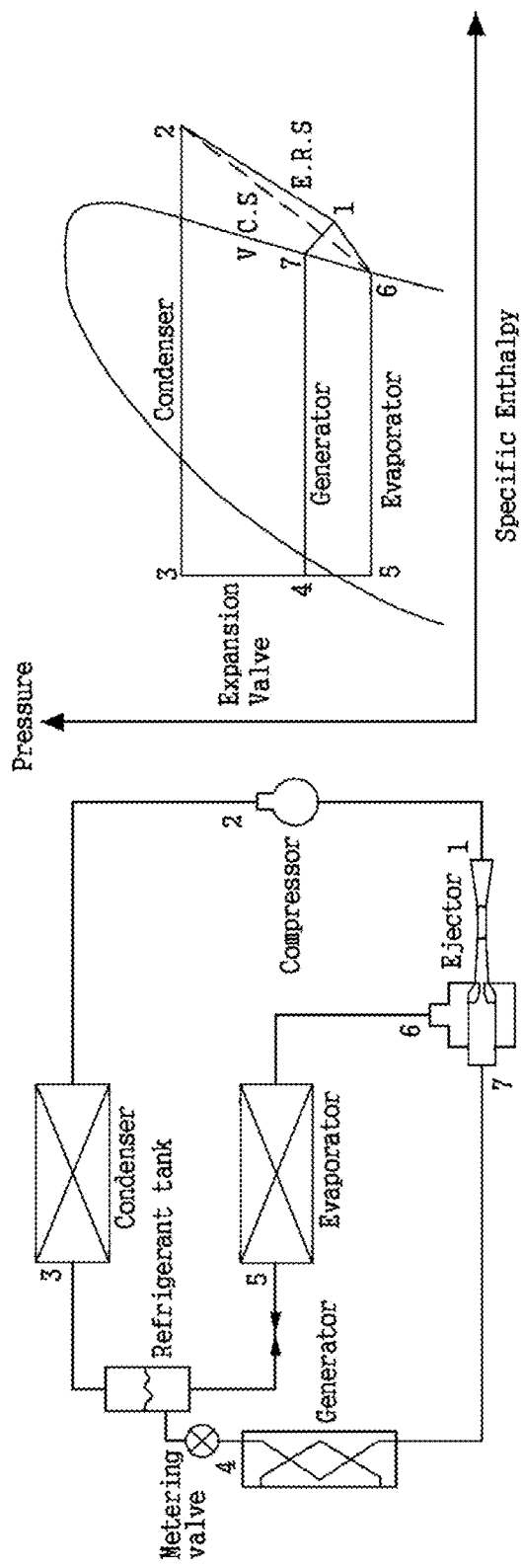
FIG. 10 is a schematic view for illustrating an ejector refrigerant system and is a diagram for a pressure enthalpy according to the present invention.

FIG. 10 is a schematic view of an ejector refrigerant system and shows a p-h diagram. A refrigerant discharged from a condenser is distributed from a refrigerant tank to an evaporator and a heat exchange unit. A refrigerant flowing to the evaporator is expanded in an expansion valve and then is exchanged heat with a load side to be sucked into an ejector. A flow ratio of a refrigerant flowing to the heat exchange unit is controlled in a flow control valve and then is exchanged heat with a high-temperature heat source in the heat exchange unit to be flowed into a motive pipe of the ejector. The flow control valve makes the refrigerant distributing and flowing the refrigerant in a ratio of 2:8 toward the heat exchange unit and the expansion valve. The temperature and pressure of the refrigerant exchanged heat with a high temperature waste heat in the heat exchange unit are increased to be mixed with a refrigerant influxed into the evaporator from the ejector, and then sucked through a discharging pipe of the ejector to a compressor.

The temperature and pressure of the refrigerant discharged to the ejector are more increased than those of the refrigerant sucked to the evaporator. Accordingly, a power consumption of the compressor can be reduced so that the COP of the ejector refrigerant system becomes higher than that of the vapor compressor system.

According to an embodiment of the present invention, the pressure and temperature of the refrigerant discharged from the ejector become increased in comparison with the refrigerant sucked into the evaporator, thereby reducing a power consumption of the compressor. As a result, the COP of the refrigerant discharged from the ejector is increased as compared with the vapor compressor system.

All such changes, modifications, variations and other uses and applications which do not depart from the spirit and scope of the invention are deemed to be covered by the invention which is limited only by the claims which follow.

What is claimed is:

1. A refrigerator for a refrigerator vehicle comprising:
a vapor compressor system where a compressor, a condenser, a refrigerant tank, an expansion valve, and an evaporator are connected through a flowing line;
an ejector refrigerant system whose one end connected to an outlet of the refrigerant tank and whose other end connected to an inlet of the compressor;
a flow control valve for distributing a refrigerant flowing between the ejector refrigerant system and the outlet; and
a controller connected to an engine of a refrigerating vehicle connected to control the flow control valve if an RPM of the engine exceeds a setting value,
wherein the flow control valve distributes a gaseous refrigerant to the ejector of the ejector refrigerant system and the expansion valve of the vapor compressor system,
wherein the ejector refrigerant system comprises:
an ejector including a body in which a suction room is formed, a motive pipe connected to the body, a suction pipe, and a discharging pipe;
a first ejector line for the outlet of the refrigerant tank and the motive pipe;
a second ejector line for connecting the discharging pipe and the inlet of the compressor;
a third ejector line for connecting the suction pipe and an outlet of the evaporator;
a heat exchanging unit for recycling a waste heat from the engine and arranged in the first ejector line;
a first valve arranged between the third ejector line and the outlet of the evaporator; and
a second valve arranged between the second ejector line and the inlet of the compressor,
wherein the flow control valve distributes the refrigerant discharged from the refrigerant tank to the heat exchanging unit and the expansion valve in response to a signal from the controller, the refrigerant discharged from the refrigerant tank including a first refrigerant discharged to the heat exchanging unit and a second refrigerant discharged to the expansion valve,
wherein the heat exchange unit allows the first refrigerant to exchange heat with the waste heat such that the first refrigerant whose temperature is increased flows into an inside of the ejector,
wherein the first valve controls the second refrigerant to flow into the inside of the ejector such that the ejector mixes the first refrigerant whose temperature is increased and the second refrigerant to produce a mixed refrigerant, a temperature of the mixed refrigerant being higher than a temperature of the second refrigerant, and
wherein the second valve controls the second refrigerant to flow into the compressor.

2. The refrigerator of claim 1, wherein the setting value is 1,800 RPM.

3. The refrigerator of claim 1, wherein the flow control valve distributes a gaseous refrigerant discharged from the compressor to the ejector and the expansion valve in the ratio of 1:9 to 3:7.

4. A method of controlling a refrigerator for s refrigerating vehicle using an ejector comprising:
providing air to a refrigerating container by operating a compressor of a vapor compressor system by a power of an engine of the refrigerating vehicle and making a refrigerant flowing along a flowing line;
determining whether an RPM of the engine of the refrigerating vehicle exceeds a setting value through a signal sensed from an RPM sensor using a controller; and
distributing the refrigerant discharged from the compressor to an expansion valve of the vapor compressor system and a heat exchanging unit for recycling a waste heat from the engine by controlling a flow control valve if the RPM exceeds the setting value, the refrigerant discharged from the compressor including a first refrigerant discharged to the heat exchanging unit and a second refrigerant discharged to the expansion valve,
wherein distributing the refrigerant comprises:
allowing the first refrigerant to exchange a heat with the waste heat in the heat exchange unit such that the first refrigerant whose temperature is increased flows into an ejector of an ejector refrigerating system;
controlling the second refrigerant to flow into the ejector such that the ejector mixes the first refrigerant whose temperature is increased and the second refrigerant to produce a mixed refrigerant, a temperature of the mixed refrigerant being higher than a temperature of the second refrigerant; and controlling the mixed refrigerant to flow into the compressor.

* * * * *